(12) United States Patent
Geist et al.

(10) Patent No.: US 9,633,243 B1
(45) Date of Patent: Apr. 25, 2017

(54) METHOD AND APPARATUS FOR FACILITATING A WIRELESS TRANSACTION EVENT VIA A RFID TAG DEVICE WITH A MOBILE DEVICE

(71) Applicants: Wyatt Drake Geist, Davie, FL (US); Jaime Andres Borras, Pembroke Pines, FL (US)

(72) Inventors: Wyatt Drake Geist, Davie, FL (US); Jaime Andres Borras, Pembroke Pines, FL (US)

(73) Assignee: GEOTOLL, INC., Plantation, FL (US)

( * ) Notice: Subject to any disclaimer, the term of this patent is extended or adjusted under 35 U.S.C. 154(b) by 418 days.

(21) Appl. No.: 13/945,990

(22) Filed: Jul. 19, 2013

(51) Int. Cl.
*G06K 7/10* (2006.01)

(52) U.S. Cl.
CPC ................................ *G06K 7/10366* (2013.01)

(58) Field of Classification Search
CPC ........ G07B 15/00; G07B 15/02; G07B 15/06; G07B 15/063; G06K 19/0723; G06K 19/0707; G06K 19/0705; G06K 19/0724; G06K 19/07767; G06K 7/0008; G06Q 20/32; G06Q 20/3278
USPC .......................................................... 705/13
See application file for complete search history.

(56) References Cited

U.S. PATENT DOCUMENTS

| | | | |
|---|---|---|---|
| 7,232,069 B1* | 6/2007 | White | 235/451 |
| 2006/0152369 A1* | 7/2006 | Reunamaki | 340/572.1 |
| 2009/0033498 A1* | 2/2009 | Huomo | 340/572.3 |
| 2009/0117872 A1* | 5/2009 | Jorgenson et al. | 455/334 |
| 2009/0315673 A1* | 12/2009 | Huang | G06K 7/0008 340/5.61 |
| 2012/0112887 A1* | 5/2012 | Horne et al. | 340/10.1 |
| 2014/0025444 A1* | 1/2014 | Willis | 705/13 |
| 2014/0229246 A1* | 8/2014 | Ghaffari | 705/13 |

* cited by examiner

*Primary Examiner* — James Yang
*Assistant Examiner* — Laura Nguyen
(74) *Attorney, Agent, or Firm* — Patents on Demand P.A.; Brian K. Buchheit; Scott M. Garrett

(57) ABSTRACT

An RFID tag device is associated with a mobile device to facilitate wireless transactions and identification. The RFID tag device includes two RF interfaces; one can communicate with RF tag readers, and one can communicate with the mobile device. The RFID tag device can be operated in a passive mode and stores transaction information for later retrieval by the mobile device, or it can be operated in an active mode where it is powered by the mobile device through the RF interface for communicating with the mobile device so that it can be read via the RFID interface. The RFID tag device can further detect and ignore communications between the mobile device and another device using the same communications mode and used by the RFID tag device to communicate with the mobile device.

17 Claims, 6 Drawing Sheets

| TRANSACTION | TIME | AMOUNT |
|---|---|---|
| Toll – location1 | 7:34 | $1.00 |
| Toll – location2 | 8:12 | $1.00 |
| Parking – City Center | 8:28 | $3.00 |
| Coffee Plus | 8:43 | $4.56 |
| - - - | | |
| Townplace Gate | 6:23 | $0.00 |

US 9,633,243 B1

METHOD AND APPARATUS FOR FACILITATING A WIRELESS TRANSACTION EVENT VIA A RFID TAG DEVICE WITH A MOBILE DEVICE

FIELD OF THE DISCLOSURE

The present disclosure relates generally to data tag devices and more particularly to radio frequency data tag devices used to conduct transactions.

BACKGROUND

As a result of the prevalence of mobile devices, such as smart phones, tablet devices, and others, there has been an increased interest in using such devices to automate a variety of tasks not traditionally associated with mobile devices. These devices are typically manufactured to have one or more radio interfaces that include a transceiver, which is so named because it includes both a transmitter and a receiver. The transceiver is used for modulation and transmission of information, and for reception and demodulation of information, and is typically operated according to a known air interface or radio protocol. A radio communication protocol defines various rules and conventions for communicating, including the format of a radio channel or channels, the format of data, the type of modulation used, the frequencies used, control signals, and so on. Having multiple radio interfaces allows a device to interact with multiple other devices.

Another field that has gained in interest is radio frequency identification (RFID) data tag devices. RFID tag devices are used to store information, such as an identifier, that can be read at a distance by a reader. The reader transmits a signal through the air, and, upon receiving the signal, the RFID tag device responds by transmitting data to the reader. RFID tag devices are used in numerous applications, and can be passive or active, referring to how the RFID tag device is powered. A passive RFID tag device is powered by the reader signal; the passive RFID tag device collects energy from the reader signal and uses the collected energy to power the circuitry and transmit data to the reader. An active RFID tag device contains a battery and does not need to collect energy from the reader. Some RFID tag devices can be semi-passive or semi-active, being a hybrid of active and passive configurations. An RFID tag device can be stuck on, or otherwise mounted on something to associate the identifier in the RFID tag device with that thing.

One field where RFID technology is presently used is for transactions. An RFID tag device identifier can be associated with an account, and money transferred from the account to an authorized recipient upon reading information from the RFID tag device in an authorized manner. One popular use of RFID technology for transactions is in vehicular tolls. A vehicle operator purchases a toll tag that includes an RFID tag device, having an identifier in the RFID tag device. The identifier is associated with a toll account for a toll authority. The vehicle operator places the toll tag in a vehicle, and upon passing through a toll gateway where the RFID tag device information is read, a toll fee is debited from the account associated with the toll tag. The toll tag devices are often mounted in the vehicle in a permanent or semi-permanent manner. Consequently, the RFID tag device cannot easily be moved from one vehicle to another, such as if the owner of the RFID tag device rents a vehicle. Furthermore, the user is not able to interact with the RFID tag device. In order to see account activity, the user must access account information, such as via a web site for such accounts.

Accordingly, there is a need for a method and apparatus for facilitating a wireless transaction event via a RFID tag device with a mobile device in a way that allows the user to interact with the RFID tag device and to take the RFID tag device with the mobile device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
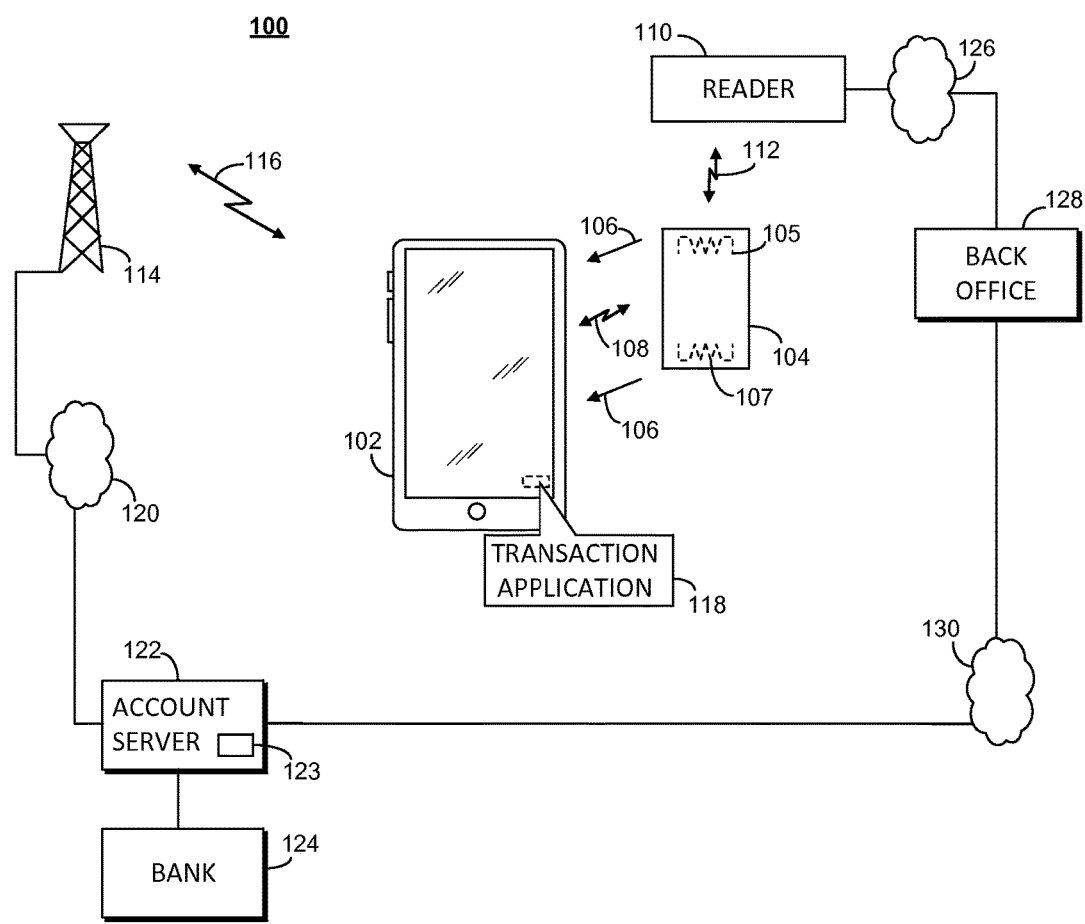
FIG. 1 is a system diagram of a mobile device and RFID tag device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments solve the problems associated with conventional RFID transaction devices, such as the lack of variety of transactions that can be conducted, and the inability to review transaction events carried out by an RFID tag device by providing an interface on the RFID tag device that can be accessed by a mobile device (or equivalent). The mobile device can present transaction records to a user for review. The RFID tag device includes a first RF interface that operates at a first RF frequency, a second RF interface that operates at a second RF frequency, a controller coupled to the first and second RF interfaces that transfers information between the first and second RF interfaces, and an energy collection circuit that collects energy received via the first RF interface and energy received via the second RF interface in a capacitor. Energy collected in the capacitor is used to power the first RF interface, the second RF interface, or both the first and second RF interfaces together, and the controller.

FIG. 1 is a system 100 of a mobile device 102 and RFID tag device 104 in accordance with some embodiments. The mobile device 102 is a small, portable computing device that includes one or more radio transceivers. Examples of mobile devices include, for example, cellular or "smart" phones, tablet computing devices, personal digital assistants, and so on. In addition to radio interface(s), a mobile device 102 includes a graphical display and input means to allow a user of the mobile device 102 to interact with, and control operation of the mobile device 102, as well as memory and a processor to execute program code for applications, programs, operating systems, and other software elements. The memory includes read only memory (ROM) and random access memory (RAM), and can include other types of memory such as flash memory, and can include memory expansion such as memory card slots.

The RFID tag device 104 contains identity information that can be used for conducting wireless transactions. Accordingly, the RFID tag device 104 includes at least two radio frequency (RF) interfaces. A RF interface is a wireless radio interface and includes an antenna and transceiver that operate according to a defined protocol or air interface. The air interface defines channel format, timing, modulation, and other aspect for radio communication. The RFID tag device 104 includes a first RF interface 107 to communicate with the mobile device 102 via radio link 108, and a second RF interface 105 to communicate with another device, such as an RFID reader 110, over radio link 112. The radio links 108, 112 indicate communication between the devices over their respective RF interfaces. The RFID tag device 104 can be held against, or substantially close to the mobile device 102, such as by forming the RFID tag device 104 in the form of a card with an adhesive layer to affix the RFID tag device 104 onto a surface (such as a back surface) of the mobile device 102 as indicated by arrows 106. In some embodiments the mobile device 102 and RFID tag device 104 communicate via radio link 108 using a near field communication (NFC) protocol, such as that specified by ISO/IEC 18000-3 which has an effective range of about 10 cm and operates at 13.56 MHz. Typically the NFC communication between the mobile device 102 and the RFID tag device 104 will be encrypted for security purposes. In addition to exchanging data over the radio link 108, the mobile device 102 can power the RFID tag device 104 via radio link 108. The energy of the NFC signal from the mobile device can be collected in the RFID tag device and used to by the RFID tag device 104 to respond to the mobile device over link 108, as well as for RFID operations via radio link 112. Radio link 112 between the RFID tag device and RFID reader 110 can be a RFID interface, such as, for example, that specified by ISO/IEC 18000-6c, ISO/IEC 18000-6b, or other known RFID interface standards. In some embodiments, the link 112 can be specifically configured to operate according to a vehicular toll standard for use in wireless tollway systems. In such embodiments, the RFID reader 110 can be a tollway reader that is positioned over a traffic lane of a toll road. The RFID reader 110 includes an antenna and transceiver to support communications with RFID tag devices, as is known. As the RFID tag device 104 passes by the reader 110, a signal from the reader 110 causes the RFID tag device 104 to respond via link 112 with identification information to identify the RFID tag device 104. Furthermore, the reader 110 can, in some embodiments, transmit transaction information to the RFID tag device 104 via link 112. The transaction information can include information such as an identification of the reader 110, location, a toll amount, the time, and so on. In some embodiments the reader 110 does not transmit transaction information to the RFID tag device 104, and the RFID tag device 104 only indicates to the mobile device 102 that it has been read (i.e. that it has responded to a reader signal).

The mobile device 102 contains a transaction application 118 that allows the mobile device 102 to facilitate transactions, including processing transaction information received from the RFID tag device 104 or transaction information generated by the mobile device 102 upon receipt of an indication of a transaction by the RFID tag device 104, and forwarding the transaction information to an account server 122. In some embodiments the mobile device 102 initializes the RFID tag device 104 via link 112 before the RFID tag device interacts with the RFID reader 110 via link 108. For example, in a vehicular toll embodiment, the mobile device 102 can determine that the mobile device 102 is approaching a known toll gateway location using location information and road map data that indicates the location of toll gateways. When the mobile device 102, is within a selected distance of a toll gateway, the mobile device 102 can energize NFC link 108 to power up the RFID tag device 104. As the mobile device 102 and RFID tag device 104 pass through the toll gateway, the toll transaction occurs over link 112, and the RFID tag device 104 transmits transaction information to the mobile device 102 via link 108. Any transaction information received at the mobile device 102 from the RFID tag device 104 can be processed by the transaction application 118, which can store the transaction information as well as display the transaction information upon receipt of the transaction information, or at a later time upon user request. Once the RFID tag device 104 completes transmitting to the mobile device 102 subsequent to the transaction, the mobile device 102 can shut off the NFC link 108 to conserve battery life of the mobile device 102.

In some embodiments the mobile device 102, in addition to the radio interface to support radio link 108, comprises another radio interface to communicate at farther distances, such as a cellular transceiver for communicating over a cellular radio telephony link 116 with a cellular telephony infrastructure network 114. The cellular radio telephony link 116 is operated in accordance with a cellular data communications standard, such as, for example, the Long Term Evolution (LTE) standard, the Global System for Mobile Communications (GSM) Enhanced Data rates for GSM Evolution (EDGE), or code division multiple access (CDMA), among other known standards. The mobile device 102 can transmit transaction information over the cellular telephony radio link 116, through a wide area network 120, such as the Internet, to an account server 122 that maintains account information for an account 123 associated with the RFID tag device 104. The account server 122 can be linked to one or more banks 124 to maintain funding for transactions applied to the account 123 associated with the RFID tag device 104. The account server 122 can communicate with a back office server 128 that is associated with reader 110 over similar, if not the same, networks 126, 130. The back office server 128 logs transaction information and reconciles payment of funds due with the account server 122. Processing the transaction information is typically performed by batch processing, although in some embodiments it is contemplated that processing can be performed on a per-transaction or per-occurrence basis. The account server 122 can verify transactions based on transaction information received from the mobile device 102. The mobile device, in some embodiments, can use other radio interfaces such as, for example, a wireless local area network (WLAN) interface, such as that described in the Institute of Electrical and Electronic Engineers (IEEE) standard 802.11, and often referred to as "WiFi." In some embodiments the mobile device 102 can use the near field communication interface 108 to communicate with another device besides the RFID tag device 104, which can include a networked device that can forward transaction information from the mobile device 102 to the account server 122.

Figure 2:
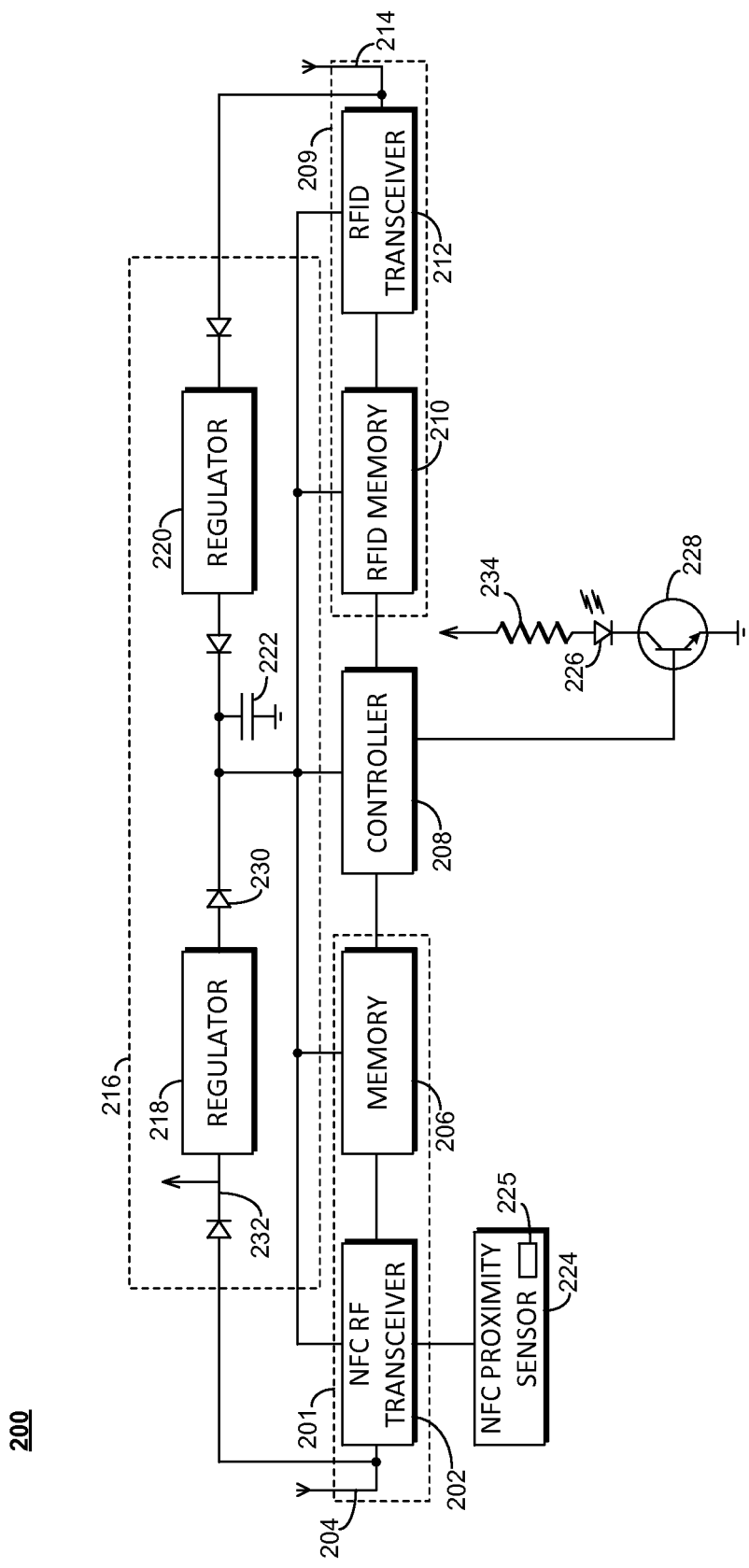
FIG. 2 is a schematic diagram of a RFID tag device in accordance with some embodiments.

FIG. 2 is a schematic diagram of a RFID tag device 200 in accordance with some embodiments. The RFID tag device 200 can be substantially similar to the RFID tag device 104 shown in FIG. 1. Generally, the RFID tag device 200 includes circuitry to realize two different RF interfaces, and can include a memory associated with each interface, a controller for operating the RFID tag device, and an energy collection circuit to collect energy from the RF interfaces to power the RFID tag device 200. Accordingly, the RFID tag device 200 includes a first RF interface 201, that can be, for example, a NFC RF interface. The first interface 201 includes an antenna 204 and a first transceiver 202 that communicates according to a first RF protocol, such as an NFC protocol. The first RF interface 201 can further include a first memory 206 coupled to the first transceiver 202, and can be used to store data received over the first RF interface 201, or data that is to be transmitted over the first RF interface 201, or both.

The RFID tag device 200 further includes a second RF interface 209, such as a RFID interface, that includes antenna 214 and a second transceiver 212 to communicate according to a second RF protocol, such as, for example, an RFID communication protocol. The second RF interface 209 operates independently of the first RF interface 201. The second RF interface 209 can further include a second memory 210, such as an RFID memory, that can be coupled to the second transceiver 212 and can contain, for example, one or more substantially unique identifiers that can be used to identify the RFID tag device 200, and which can be associated with a user or a user account in remotely located computing equipment (e.g. account servers).

In some embodiments it is contemplated that there is only one memory shared by each of the RF interfaces 201, 209. In some embodiments, the controller 208 can be provided with registers, cache, or other memory, that can operate as the first and second memories 206, 210. Furthermore, the first memory 206, when implemented as a separate memory, can be a dual interface memory that can be accessed by the first transceiver 202 and the controller 208 by separate, independent memory interfaces. The controller 208 can move data between the memories 206, 210, as well as perform other operations such as formatting data when moving data between memories 206, 210. In some embodiments memory 210 is a ROM, and data received via first RF interface 209 is routed directly to the controller 208. In some embodiments memory 206 is a dual interface memory that is writable, and non-volatile.

The RFID tag device 200 further includes an energy collection circuit 216 that is used to collect energy received from remote transmitters at antennas 204, 214. A first regulator 218 can be used to collect energy at the first RF interface antenna 204, and a second regulator 220 can be used to collect energy at the second RF interface antenna 214. Simple rectifiers (diodes) between antennas 204, 214 and regulators 218, 220 can be used to rectify alternating current (AC) signals to store charge in, for example, a capacitor 222, through blocking diodes 230 The capacitor 222 can be electrically coupled to the interfaces 201, 209, alternatively or at the same time, and the controller 208, to provide power to those components as necessary.

The RFID tag device 200 can further contain circuitry to facilitate optimum location of the RFID tag device 200 on a mobile device. For example, a light emitting diode 226 can be controlled by a switch transistor 228 that is operated by the controller 208. Upon power-up or receiving an appropriate command via first RF interface 201 from the mobile device, the controller can switch on transistor 228, allowing current to flow through LED 226 from node 232, as limited by resistor 234. During this operation the mobile device continuously transmits over the NFC RF interface so that capacitor 222 is continuously receiving electrical energy via regulator 218. The resulting voltage evident across node 232 is dependent on the efficiency of the coupling between the NFC transmitter of the mobile device and the first RF interface 201. As the RFID tag device is moved relative to the mobile device, the intensity of light emitted from the LED varies in correspondence with the efficiency of the NFC link, allowing the user to optimally locate the RFID tag device 200 on the mobile device.

Figure 3:
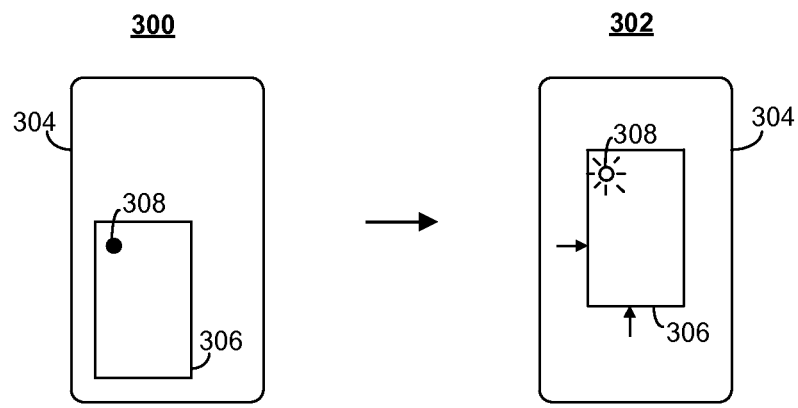
FIG. 3 is a diagram illustrating a placement procedure to optimally locate an RFID tag device on a mobile device.

FIG. 3 is a diagram illustrating a placement procedure to optimally locate an RFID tag device 306 on a mobile device 304. The RFID tag device 306 can be substantially the same as RFID tag device 200, and includes an LED 308 such as LED 226 of FIG. 2. In a first location 300 the RFID tag device 306 is not optimally located, resulting in a weak NFC coupling, and the LED 308 is dim or even unlit. In a second location 302 the RFID tag device 306 is optimally located with respect to the mobile device 304, producing the highest NFC coupling efficiency, resulting in the LED 308 being brightly lit due to the higher voltage across node 232.

Referring back to FIG. 2, it is further contemplated that the user of the mobile device may desire to use the NFC interface of the mobile device for some purpose other than communicating with the RFID tag device 200. Accordingly, the RFID tag device 200 includes a NFC proximity sensor 224 that senses the proximity of another NFC device, and deactivates the first RF interface 201. The NFC proximity sensor 224 allows the RFID tag device 200 to determine whether NFC signals received by the first transceiver 202 are coming from the mobile device, or some other NFC device. For example, since the RFID tag device 200 is typically held against, or attached to, the mobile device, the NFC signals from the mobile device will always come from one direction relative to the RFID tag device, while NFC signals from other devices will come from the opposite direction, being on the opposite side of the RFID tag device from the mobile device. The NFC proximity sensor 224 can include a directional discriminator 225 that indicates the direction from which NFC signals are being received. NFC signals received from the opposite direction of the mobile device (relative to the RFID tag device 200) will have an opposite polarity, which can be detected by the directional discriminator 225. When NFC signals are being received from a direction opposite that of the mobile device, the NFC proximity sensor 224 can provide a proximity signal to the first RF transceiver 202 that causes the RFID tag device 200 to ignore NFC signals from the mobile device and the other NFC device, allowing the mobile device and other NFC-equipped devices to communicate. The NFC proximity sensor can have a timer so that, for a time after detecting an NFC signal from the opposite direction, the RFID tag device ignores all NFC signals to allow the mobile device and the other NFC device to communicate. That is, once an NFC signal from the opposite direction is detected, for a brief time thereafter the RFID tag device can ignore NFC signals from the mobile device on the assumption that the mobile device is communicating with the other NFC device.

Furthermore, the NFC proximity sensor 224 can detune antenna 204 so as to reduce interference with NFC signals being transmitted between the mobile device and another NFC device through the RFID tag device 200 since the RFID tag device will be disposed between the mobile device and the other NFC device. To detune the antenna 224 the NFC proximity sensor 224 can apply an impedance load or a short to the antenna 204 to shift its operating frequency out of the range of NFC signals. Furthermore, the NFC proximity sensor 224 can contain a timer element that maintains the first RF interface inactive for a period of time after detecting NFC signals from the other NFC device to allow the mobile device and the other NFC device to communicate. Thus, when an NFC signal is initially received from a first direction, the RFID tag device 200 commences communication via the first RF interface 201, and when an NFC signal is initially received from a second direction that is opposite the first direction with respect to the RFID tag device 200 the RFID tag device 200 refrains from communicating via the first RF interface.

Figure 4:
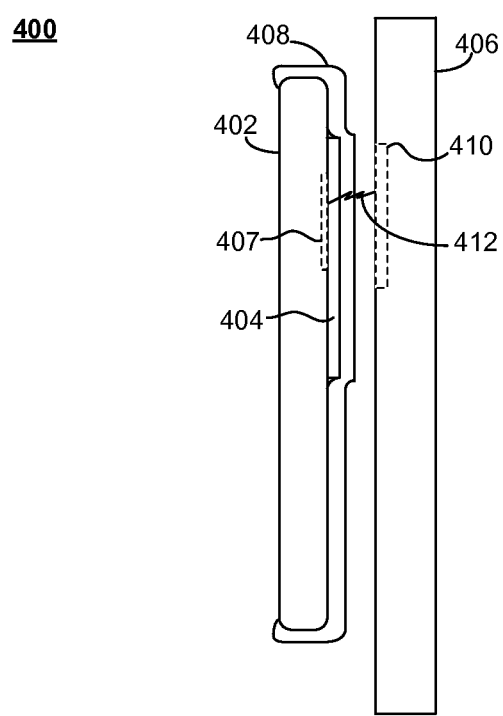
FIG. 4 is a diagram illustrating use of a near field interface of a mobile device with a corresponding near field device while having an RFID tag device mounted on the mobile device in accordance with some embodiments.

FIG. 4 is a diagram illustrating use 400 of a near field communication interface of a mobile device 402 with a corresponding near field device 406 while having an RFID tag device 404 mounted on the mobile device in accordance with some embodiments, exemplifying a use of the NFC proximity sensor 224 of FIG. 2. Here, the RFID tag device 404 is similarly provided with an NFC proximity sensor. The RFID tag device 404 can be affixed to the mobile device 402 by adhesive on the RFID tag device 404, or it can be retained in position with the mobile device 402 by a cover or case 408 that fits over the mobile device 402, such as a compliant rubberized cover, as is known. The mobile device 402 includes an NFC interface 407, that can interact with an NFC interface 410 of the NFC device 406. The NFC device 406 can be, for example, a point of sale system component to allow contactless electronic payment. The NFC device 406 can be, in other embodiments, another mobile device. Other types of NFC devices that operate equivalently will occur to those skilled in the art. The NFC device 406 transmits an NFC signal 412, which can be detected by the mobile device 402 at the mobile device's NFC interface 407, and it can also be detected by the RFID tag device 404 at a proximity detector, such as NFC proximity sensor 224 of FIG. 2. The NFC proximity sensor differentiates between NFC signals from direction of the mobile device and the NCF signals from the direction of the NFC device 406. When NFC signals from the NFC device are detected, the RFID tag device 404 ignores NFC signals so as not to interference with NFC activity between the NFC device 406 and the mobile device 402.

Figure 5:
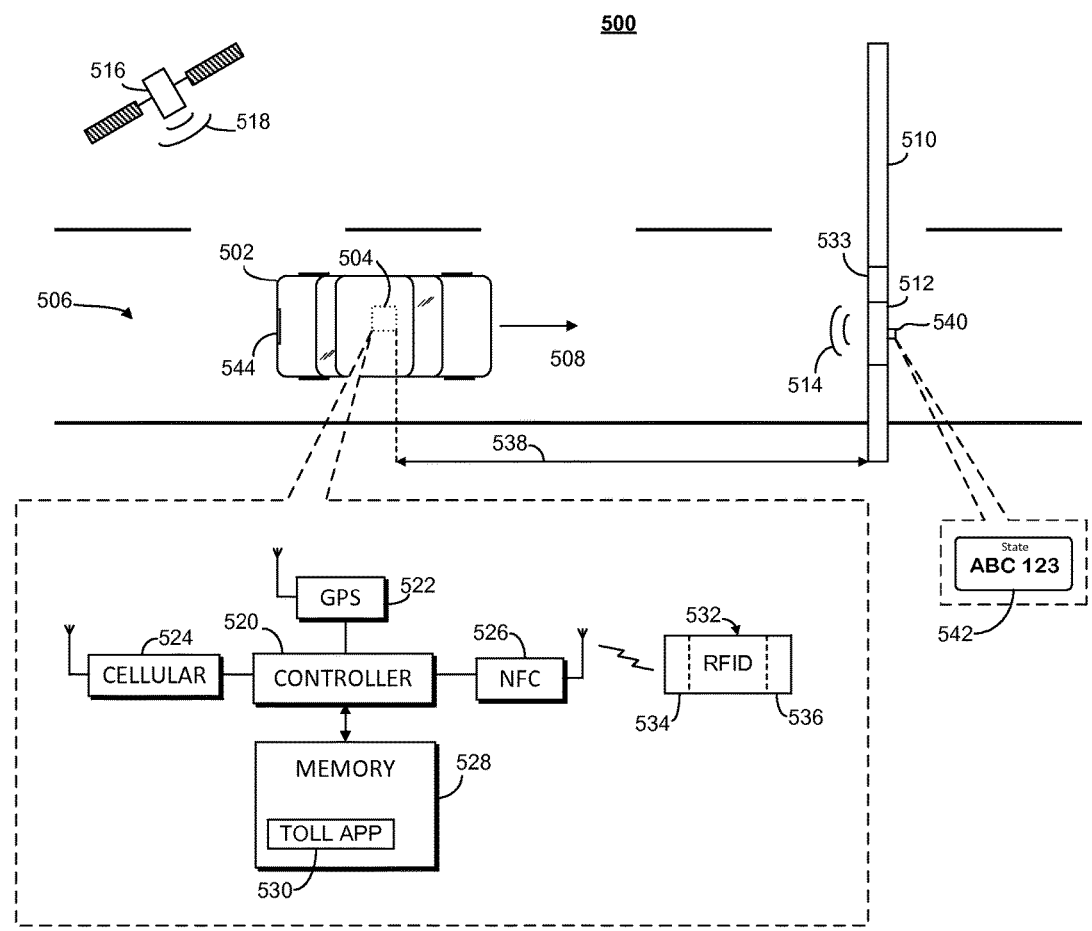
FIG. 5 is diagram showing operation of a toll transaction procedure of a mobile device using an RFID tag device in accordance with some embodiments.

FIG. 5 is a diagram showing a tollway example 500 of operation of a toll transaction procedure of a mobile device using an RFID tag device 532 in accordance with some embodiments. A vehicle 502 travelling in a lane of traffic 506 contains a mobile device 504 that has an RFID tag device 532 designed in accordance with the present teachings attached to, or otherwise held in proximity with the mobile device 504. The vehicle 502 travels in the direction of arrow 508 towards a toll gateway 510 which contains an RFID reader 512 and emits an RFID reader signal 514. The mobile device 504 can include several components and subsystems, such as a controller 520 that is coupled to a global positioning system (GPS) receiver 522, a cellular telephony radio transceiver 524, and NFC transceiver 526, and memory 528. An toll application 530 can be stored in the memory that is executed by the controller 520. The memory 528 can represent an aggregation of different types of memory, including ROM memory, RAM memory, bulk storage memory, flash memory, and so on. The GPS receiver 522 can receive GPS signals 518 transmitted by GPS satellites 516 to determine the location of the GPS receiver 522 as is known. The toll application 530 can request location information from the GPS receiver to compare the location of the GPS receiver 522 (and hence the location of the mobile device 504) with a map of toll gateway locations. As the mobile device 504 gets within a certain distance 538 of the toll gateway, the toll application 530 causes the mobile device to turn on the NFC transceiver 526 so that it transmits to an NFC RF interface 534 on the RFID tag device 532, thereby providing power (through the energy collector circuitry). Then the vehicle 502 then passes under the toll reader, the reader signal 514 is received by an RFID interface 536 of the RFID tag device 532, and the RFID tag device responds to the reader signal by transmitting the RFID information, including a substantially unique identifier to allow toll charge to be debited to an account associated with the identifier, as well as the vehicle license tag number. The reader signal 514 can include information such as an identifier of the toll gateway 510, the present time, the toll amount, and so on. Alternatively, some of the transaction information, such as location of the toll gateway and time can be provided by the mobile device 504 itself. Once the RFID tag device 532 has been read by the toll reader 512, an indication of the transaction, including transaction information, can be transmitted from the RFID tag device 532 to the mobile device via the NFC RF interface 534.

In some embodiments the RFID tag device 532 may not be presently operative when the vehicle passes through the toll gateway 510. Accordingly, the toll reader 512 will not read the RFID tag device 532 as the vehicle passes through the toll gateway, which could result in no toll being paid, resulting in an infraction for the driver of the vehicle 502. The toll gateway 510 can include a vehicle detection component 533 that detects vehicles as they approach and as they pass the toll gateway 510. The vehicle detection component 533 detects vehicles using any of a number of detection technologies, such as, for example, magnetic in-lane sensing, microwave reflection, optical detection, physical detection (e.g. air lines across the lane 506). The detection of an approaching vehicle can trigger the reader 512 to begin transmitting the reader signal 514. In the event that the reader 512 receives no response from a passing vehicle, a toll camera 540 can use an image 542 of the vehicle's license plate or tag 544. Typically, a license tag image like license tag image 542 is taken of every vehicle, but only used when there is no reception of a toll tag from the vehicle. When a toll tag response is received, the image is discarded. When no toll tag signal is received for a given vehicle, the license tag image 542 for that vehicle can be processed, such as by using optical character recognition, to determining the alphanumeric license tag number. The license tag number can be used by the toll authority to charge an account associated with the license tag number, presuming one exists, otherwise records can be used in order to issue a notice of infraction and toll citation to the registered owner of the vehicle 502.

Figure 6:
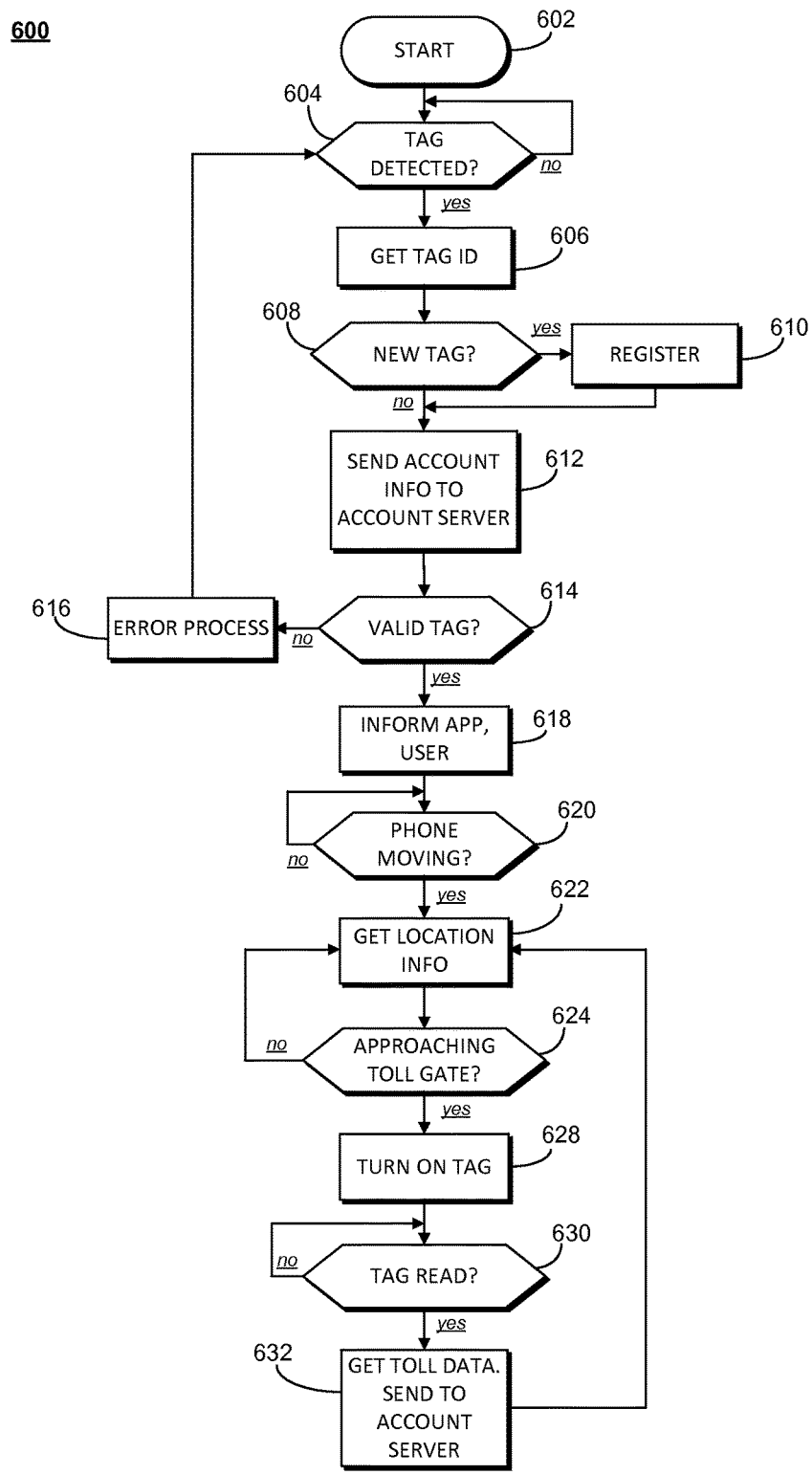
FIG. 6 is a flow chart diagram of a method for a toll transaction of a mobile device using an RFID tag device in accordance with some embodiments.

FIG. 6 is a flow chart diagram of a method for a toll transaction 600 of a mobile device using an RFID tag device in accordance with some embodiments, such as that shown in FIG. 5. Each box in the flowchart represents an abstraction of a process that can be carried out by software being executed by the mobile device, and can include necessary sub-processes, calls to operating system functions, network functions, and so on. At the start 602 of the method, the mobile device, which contains a toll application, is turned on, and the toll application is instantiated in memory. Since the toll application interacts with the RFID tag device, a first process to be performed is to determine if there is an RFID tag device present (in proximity to the mobile device), as in process 604. The RFID tag device can be detected by simply transmitting an interrogation signal over the NFC interface of the mobile device. If a RFID tag device is present, it will respond with an identifier, as indicated in process 606. Upon receiving the RFID tag device identifier at the mobile device, the mobile device determines whether the identifier is known (i.e. previously used) or whether it is a new RFID tag device, as in process 608. If the RFID tag device is a new RFID tag device, meaning not previously used, the mobile device can register the new RFID tag device as in process 610. Registration comprises transmitting information about the RFID tag device to an account server to associate the new RFID tag device with an account (either a new account or an existing account). Following the determination of whether the detected RFID tag device is new, the mobile device then sends account information to the account server to determine if the RFID tag is valid, i.e. there is an account associated with the RFID tag device, in process 614. If there is no valid account, an error process 616 is undertaken. If the RFID tag device is valid and has a valid account associated with it, the mobile device will receive an indication of such from the account server or a server associated with the account server, and the mobile device can indicate such to the user as indicated in process 618. Once the RFID tag device is found and validated, the toll application is ready to commence toll operation which starts by determining if the mobile device is moving, as in process 620. Movement can be inferred (i.e. changes in cellular signal strength, accelerometer output), or determined directly such as by comparing successive location readings output from a GPS receiver, for example. When the mobile device is moving, the toll application periodically obtains location information from the GPS receiver (or equivalent), as in process 622. In process 624 the most recent location is compared to known toll gateway locations to determine whether a toll gateway is being approached, and more particularly, whether the mobile device is within a threshold distance from a toll gateway as it is approaching a toll gateway. If the mobile device is approaching a toll gateway and is within the threshold distance, then the mobile device initiates the RFID tag device via the NFC RF interface in process 628, continuously transmitting from the NFC interface of the mobile device to provide power to the RFID tag device. The mobile device continues to transmit via the NFC interface for processes 628 and 630. In process 630 the mobile device determines whether the RFID tag device has been read by the toll gateway, such as by receiving an indication from the RFID tag device that the RFID tag device has been read. If the RFID tag device has not been read the method continues to loop back and wait, or until a time out timer kicks the method out (not shown) to return to an earlier described process. The mobile device continues to transmit to power the RFID tag device, and can periodically interrogate the RFID tag device to determine if, for example, there is new toll transaction information available in the memory of the RFID tag device associated with the NFC RF interface of the RFID tag device. Once the RFID tag device is read by the toll reader, the RFID tag device can transmit an indication of being read to the mobile device, and in some embodiments can include toll data and transaction information when transmitting to the mobile device, which in turn can send transaction information to the account server, either immediately or at some scheduled time, or upon expiration of a synchronization timer, etc., as indicated in process 632. The mobile device can, in some embodiments, infer the toll transaction information used to reconcile payment to a toll agency, including the time and location. Upon processing the toll transaction information, the method returns to process 622 (or 620 in some embodiments). Although discussed here in the context of an active toll application, where the RFID tag device is powered to an active state, it is contemplated that numerous other types of transactions can be facilitated, including those where the RFID tag device is read in a conventional passive state, without being powered by the NFC interface of the mobile device.

Figures 7, 8:
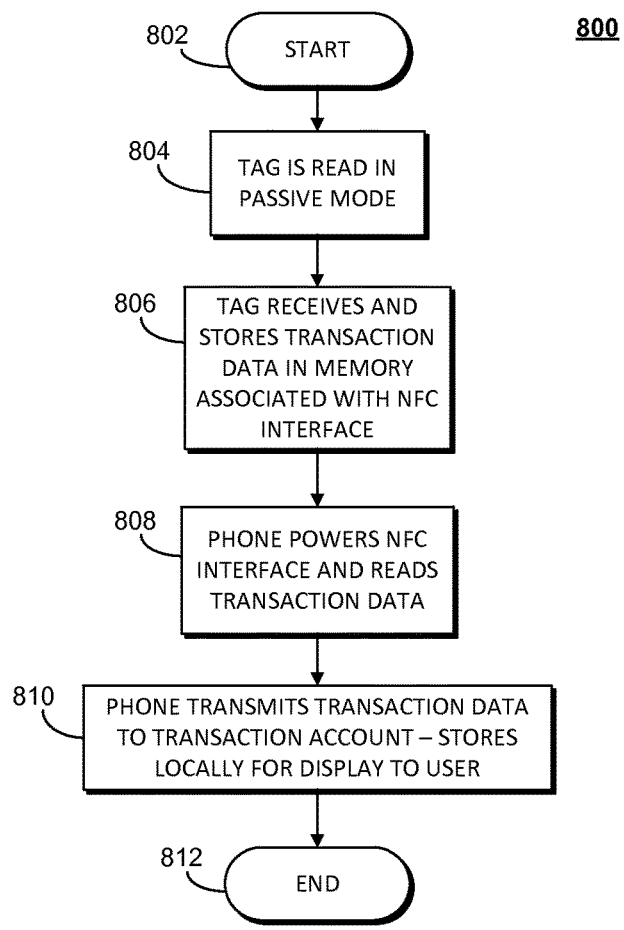
FIG. 7 is an interface diagram showing an exemplary transaction interface presented by an application executing on a mobile device using an RFID tag device in accordance with some embodiments.
FIG. 8 shows a flow chart diagram of a method of reading transaction information from an RFID tag device by a mobile device after the RFID tag device has conducted a transaction in a passive mode in accordance with some embodiments.

FIG. 7 shows a transaction interface 700 presented by an application executing on a mobile device using an RFID tag device in accordance with some embodiments. The transaction interface can be presented on a graphical display of a mobile device/in response to a user request, such as in response to user input in a menu of a transaction application. The transaction interface 700 shows a history of transactions completed by an RFID tag device associated with the mobile device on which the transaction interface 700 is displayed, in accordance with the present teachings. The transactions can be completed while the RFID tag device is in a passive state, or a powered or active state such as when power is supplied from the mobile device's NFC interface. Among the exemplary transactions shown are toll transactions 702, a parking transaction 704, a retail transaction 706, and a null transaction 708. For each transaction various transaction information can be displayed, such as the time of the transaction and the amount. Other fields of data can likewise be displayed by design, upon user choice, and so on, as will be recognized by those skilled in the art. The toll transactions 702 can represent toll transaction such as those that would be undertaken in accordance with that shown in FIGS. 5-6. A location of the toll gateway where the toll transaction occurred can be displayed, either as a separate field or as part of the name as shown. The parking transaction 704 can represent a transaction where the user paid for parking, such as by driving under a RFID reader in a parking facility with which the user has an established account, or by using the RFID tag device at a parking point of sale kiosk in a contactless payment transaction, among other examples. As such, the RFID tag device can be used in a passive RFID mode, or it can be activated based on location upon approaching the parking facility, depending on the specific manner of payment used. The retail transaction 706 indicates that the RFID tag device can be used to conduct retail transactions in accordance with known contactless payment methods, as well as upon the user accessing a menu of the transaction application to power the RFID tag device in embodiments where specific authorization is required. The null transaction 708 is an example of a use of the RFID tag for identification purposes, such as for opening the gate of a gated community from a vehicle. That is, the RFID tag device can act as a gate transponder to signal to a gate reader, causing the gate to open and allowing the vehicle to enter. As in other examples, in null transactions the RFID tag device can be operated passively or initialized and powered based on location.

FIG. 8 shows a flow chart diagram of a method 800 of reading transaction information from an RFID tag device by a mobile device after the RFID tag device has conducted a transaction in a passive mode in accordance with some embodiments. At the start 802, the RFID tag device is in a passive mode, not being powered by the mobile device's NFC interface. The RFID tag device is then read by an RFID tag reader in process 804. The RFID tag device receives transaction information and stores it in the memory associated with the NFC RF interface in process 806. Subsequent to the transaction, the mobile device interrogates the RFID tag device via the NFC interface of the mobile device to retrieve the transaction information in process 808. Upon acquiring the transaction information, the mobile device can then transmit the transaction information to an account server for processing as in process 810. If there is more than one transaction, each transaction can be associated with difference accounts, and the mobile device can determine to which account server to send the transaction information if the accounts are on different account servers. Each transaction can also be stored locally on the mobile device so that they can be reviewed by the user of the mobile device using, for example, a transaction interface as shown in FIG. 7.

Accordingly, the embodiments provide the benefit of using a dual interface RFID tag device in association with a mobile device to facilitate wireless transactions, allowing the user to take the RFID tag device with the user so that a variety of transactions can be completed in different locations, without tying the RFID tag device to one type of transaction, such as is the case with conventional RFID tag devices that are, for example, mounted in a vehicle for toll transactions. Furthermore, associating the RFID tag device with the mobile device allows the user to capture and view transaction information, and maintain records of transactions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A radio frequency identification (RFID) tag device, comprising:
   a first RF interface that operates at a first RF frequency and is configured to communicate with a mobile device;
   a second RF interface that operates at a second RF frequency and is configured to communicate with a tollway reader;
   a controller coupled to the first and second RF interfaces that transfers information between the first and second RF interfaces; and
   an energy collection circuit that collects energy received via the first RF interface in a capacitor, wherein energy collected in the capacitor is used to power the second RF interface and the controller such that the second RF interface operates in an active state with the tollway reader while energy is being collected via the first RF interface, and wherein the energy from the mobile device is received prior to interacting with the tollway reader,
   further comprising a proximity sensor including a directional discriminator coupled to the first RF interface that determines whether a signal received at the first RF interface is from the mobile device in a direction of the mobile device, and when the signal received at the first RF interface is not from the direction of the mobile device the proximity sensor renders the first RF interface non-responsive while the signal that is not from the direction of the mobile device is being received at the first RF interface.

2. The RFID tag device of claim 1, wherein the first RF interface operates using a near field communication (NFC) protocol.

3. The RFID tag device of claim 1, wherein the second RF interface operates according to a vehicular toll gateway protocol.

4. The RFID tag device of claim 1, further comprising a first memory coupled to the first RF interface and second memory coupled to the second RF interface, wherein the first memory stores transaction information in response to the RFID tag device being accessed via the second RF interface, wherein the transaction information indicates that the RFID tag device was read by the tollway reader via the second RF interface, and wherein the transaction information is moved from the second memory to the first memory.

5. The RFID tag device of claim 4, wherein the transaction information further includes at least one of a time of access or an identifier of the tollway reader that accessed the RFID tag device via the second RF interface.

6. The RFID tag device of claim 4, wherein the RFID tag device transmits the transaction information via the first RF interface in response to an interrogation signal received the first RF interface.

7. The RFID tag device of claim 1, further comprising an RFID memory coupled to the second interface, wherein the RFID memory stores a tag identifier, and wherein the tag identifier is transmitted via the second RF interface in response to a read signal received via the second RF interface from the tollway reader.

8. The RFID tag device of claim 1, wherein the RFID tag device is configured in a card format, the RFID tag device further comprising an adhesive element disposed on a major surface of the RFID tag device for affixing the RFID tag device to the mobile device.

9. The RFID tag device of claim 1, further comprising an indicator element for indicating a signal strength of a signal received via the first RF interface.

10. The RFID tag device of claim 1, further comprising a first memory coupled to the first RF interface, a second memory coupled to the second RF interface, wherein the controller is coupled to both the first and second memories and transfers information between the first and second RF interfaces by transferring information between the first and second memories.

11. A method of operating a radio frequency identification (RFID) tag device, comprising:
    receiving, via a first RF interface of the RFID tag device, from a mobile device, an initialization signal that causes the RFID tag device to operate in an active state, the initialization signal having energy, wherein the first RF interface is operated at a first RF frequency;
    storing at least some of the energy of the initialization signal in the RFID tag device;
    receiving a read signal from a tollway reader via a second RF interface of the RFID tag device, wherein the second RF interface is operated at a second RF frequency, wherein receiving the read signal occurs while operating in the active state, and the initialization signal is received prior to interacting with the tollway reader;
    responding to the read signal by transmitting, via the second RF interface and while receiving the initialization signal via the first RF interface, tag information, wherein the tag information is stored in a second memory that is coupled to the second RF interface, and wherein the transmitting utilizes some of the energy being received via the first RF interface from the initialization signal,
    further comprising a proximity sensor including a directional discriminator coupled to the first RF interface that determines whether a signal received at the first RF interface is from the mobile device in a direction of the mobile device, and when the signal received at the first RF interface is not from the direction of the mobile device the proximity sensor renders the first RF interface non-responsive while the signal that is not from the direction of the mobile device is being received at the first RF interface.

12. The method of claim 11, further comprising, responsive to receiving the read signal, storing, in a first memory that is coupled to the first RF interface, reader information received in the read signal.

13. The method of claim 12, further comprising, subsequent to receiving the read signal, receiving a query via the first RF interface, and transmitting the reader information via the first RF interface.

14. The method of claim 11, wherein receiving the initialization signal comprises receiving the initialization signal from a near field transceiver of a mobile device using a near field communication protocol.

15. The method of claim 14, further comprising the mobile device determining a location of the mobile device and further the mobile device determining that the mobile device is approaching a vehicular toll gateway based on the determined location of the mobile device, the mobile device transmitting the initialization signal in response to determining that the mobile device is approaching the vehicular toll gateway.

16. The method of claim 11, wherein receiving the read signal further includes receiving toll information including an identifier of a vehicular toll gateway including the tollway reader, the method further comprises storing the toll information in a first memory coupled to the first RF interface in response to receiving the read signal.

17. The method of claim 16, wherein receiving the read signal further includes receiving toll information including an identifier of the vehicular toll gateway, the method further comprises, in response to receiving the toll information, transmitting the toll information via the first RF interface.

* * * * *